(12) United States Patent
Trott et al.

(10) Patent No.: US 6,684,366 B1
(45) Date of Patent: Jan. 27, 2004

(54) MULTI-RATE CODEC WITH PUNCTURE CONTROL

(75) Inventors: Mitchell D. Trott, Mountain View, CA (US); Tibor Boros, Sunnyvale, CA (US); Christopher Richard Uhlik, Danville, CA (US)

(73) Assignee: ArrayComm, Inc., San Jose, CA (US)

( * ) Notice: Subject to any disclaimer, the term of this patent is extended or adjusted under 35 U.S.C. 154(b) by 451 days.

(21) Appl. No.: 09/676,139

(22) Filed: Sep. 29, 2000

(51) Int. Cl.$^7$ .................. H03M 13/03; H03M 13/00; H04L 1/18
(52) U.S. Cl. .................. 714/790; 714/775; 714/751
(58) Field of Search ........................ 714/790, 774, 714/751

(56) References Cited

U.S. PATENT DOCUMENTS

| | | | |
|---|---|---|---|
| 5,666,170 A | * 9/1997 | Stewart | 348/726 |
| 5,691,992 A | * 11/1997 | Molnar et al. | 714/752 |
| 5,691,995 A | * 11/1997 | Ikeda et al. | 714/786 |
| 6,070,074 A | * 5/2000 | Perahia et al. | 455/430 |
| 6,108,810 A | * 8/2000 | Kroeger et al. | 714/790 |
| 6,166,667 A | * 12/2000 | Park | 341/94 |
| 6,233,713 B1 | * 5/2001 | Van Den Berghe et al. | 714/790 |

FOREIGN PATENT DOCUMENTS

EP         797307 A2  *  9/1997  .......... H03M/13/12

OTHER PUBLICATIONS

Pottie et al., Multilevel Codes Based on Partitioning, 1989, pp. 87–98.

Wolf et al., P2 Codes: Pragmatic Trellis Codes Utilizing Punctured Convolutional Codes, 1995, pp. 94–99.

IEEE Transactions on Information Theory, vol. 42, No. 2, Mar. 1996, pp. 627–636.

* cited by examiner

Primary Examiner—Albert Decady
Assistant Examiner—Joseph D. Torres
(74) Attorney, Agent, or Firm—Blakely, Sokoloff, Taylor & Zafman (57) ABSTRACT

A method and apparatus are provided that provide bandwidth efficient variable bit rate communication of digital signals in a noisy channel. According to one aspect of the present invention, the invention includes receiving a puncturing request, puncturing a data packet in accordance with the puncturing request, creating a puncturing code indicating the puncturing that has been applied to the data packet and transmitting the punctured data packet and the puncturing code.

26 Claims, 4 Drawing Sheets

MULTI-RATE CODEC WITH PUNCTURE CONTROL

BACKGROUND OF THE INVENTION

1. Field of the Invention

The invention relates generally to the field of digital signal modulation and coding. More particularly, the invention relates to a multiple rate codec using convolutional and block coding with a phase shift keying constellation.

2. Description of the Related Art

Presently in transmitting and receiving digital data across noisy channels, it is difficult to find a suitable compromise between adequate bandwidth efficiency and adequate error correction capabilities. With full error correction coding, the bit rate becomes too low or the bandwidth requirements too high. With only modest error correction coding, much of the transmitted signal can become unrecoverable at the receiver. In order to provide a robust communications link, the data should be recoverable and yet bandwidth limitations should be honored. When the quality of the channel changes, a compromise that was optimal only a few seconds ago may become a poor choice.

The present invention allows the transmitted bit rate to be changed as the quality of the channel changes. This provides a better combination of error correction coding for the available channel. It is suitable for any kind of digital communications but is particularly suitable for wireless low mobility digital data communications systems.

BRIEF SUMMARY OF THE INVENTION

A method and apparatus that provide a bandwidth efficient variable bit rate communication of digital signals in a noisy channel is described. According to one aspect of the present invention, the invention includes receiving a puncturing request, puncturing a data packet in accordance with the puncturing request, creating a puncturing code indicating the puncturing that has been applied to the data packet and transmitting the punctured data packet and the puncturing code.

Other features of the present invention will be apparent from the accompanying drawings and from the detailed description that follows.

BRIEF DESCRIPTION OF THE SEVERAL VIEWS OF THE DRAWINGS

The present invention is illustrated by way of example, and not by way of limitation, in the figures of the accompanying drawings in which like reference numerals refer to similar elements and in which.

DETAILED DESCRIPTION OF THE INVENTION

Figure 1:
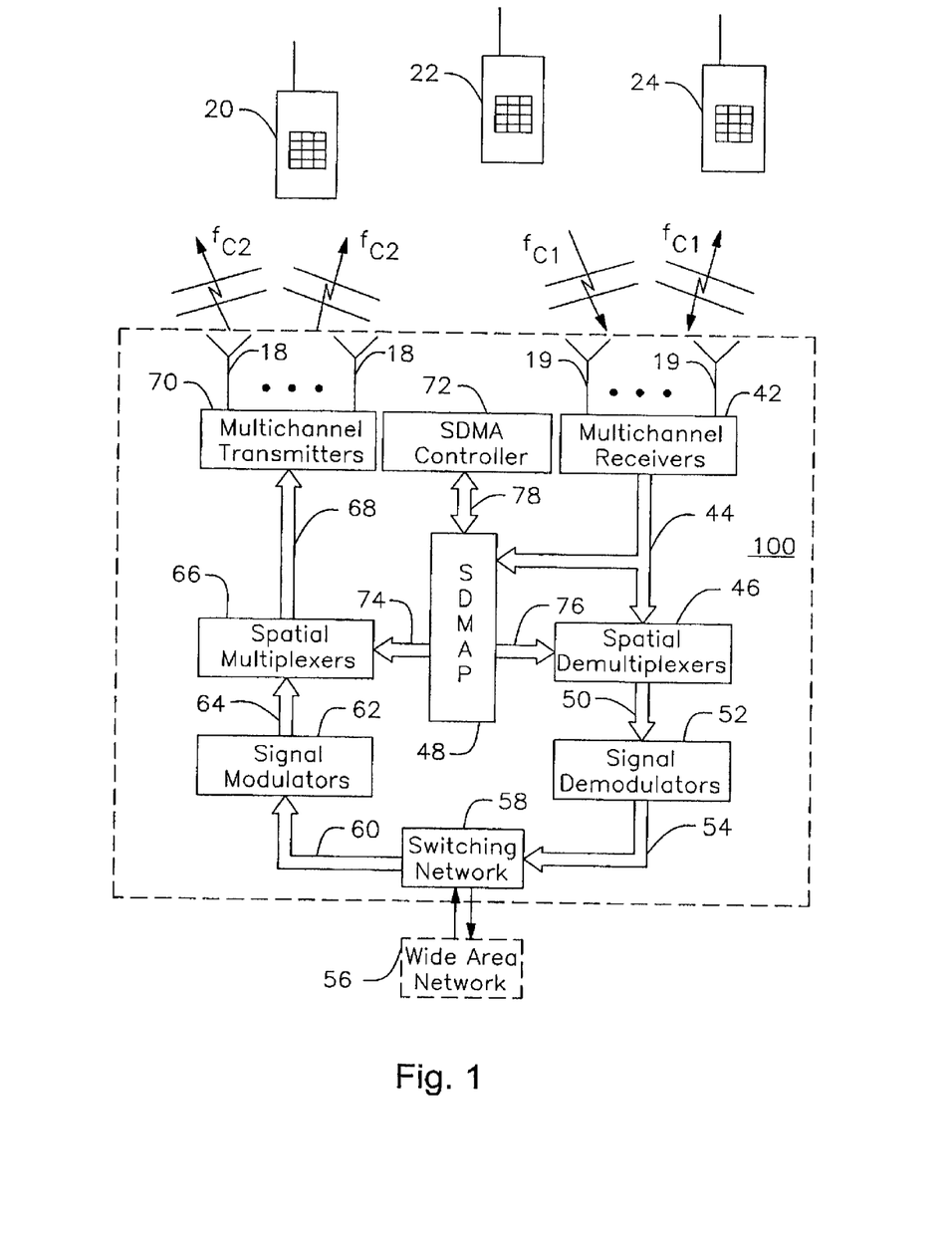
FIG. 1 is a block diagram illustrating an exemplary architecture of a wireless communication system appropriate for use with one embodiment of the present invention.

FIG. 1 shows an example of a wireless communications system or network in which a number of subscriber stations, also referred to as remote terminals or user terminals, (symbolically shown as handsets) 20, 22, 24, are being served by a base station 100 that may be connected to a wide area network (WAN) 56 for providing any required data services and connections external to the immediate wireless system. The present invention is particularly well suited to wireless communication systems and may be a fixed-access or mobile-access wireless network using spatial division multiple access (SDMA) technology in combination with multiple access systems, such as time division multiple access (TDMA), frequency division multiple access (FDMA), code division multiple access (CDMA). Multiple access can be combined with frequency division duplexing (FDD) or time division duplexing (TDD). However, the present invention may be used in any type of digital data channel. In FIG. 1, a switching network 58 interfaces with a WAN 56 for providing multi-channel duplex operation with the WAN by switching incoming WAN data to lines 60 of the base station 100 and switching outgoing signals from the base station 100, on a line 54 to the WAN. Incoming lines 60 are applied to signal modulators 62 that produce modulated signals 64 for each subscriber station to which the base station is transmitting. A set of spatial multiplexing weights for each subscriber station are applied 74 to the respective modulated signals in spatial multiplexers 66 to produce spatially multiplexed signals 68 to be transmitted by a bank of multi-channel transmitters 70 using a transmit antenna array 18. The SDMA processor (SDMAP) 48 produces and maintains spatial signatures for each subscriber station for each conventional channel, calculates spatial multiplexing and demultiplexing weights for use by spatial multiplexers 66, and spatial demultiplexers 46, and uses the received signal measurements 44 to select a channel for a new connection. In this manner, the signals from the current active subscriber stations, some of which may be active on the same conventional channel, are separated and interference and noise suppressed. When communicating from the base station to the subscriber stations, an optimized multi-lobe antenna radiation pattern tailored to the current active subscriber station connections and interference situation is created. Suitable technologies for achieving such a spatially directed beam are described, for example, in U.S. Pat. No. 5,828,658, issued Oct. 27, 1998 to Ottersten et al. and U.S. Pat. No. 5,642,353, issued Jun. 24, 1997 to Roy, III et al.

Returning to FIG. 1 spatial demultiplexers 46 combine received signal measurements 44 from the multi-channel receivers 42 and associated antenna array 19 according to spatial demultiplexing weights 76, a separate set of demultiplexing weights being applied for each subscriber station communicating with the base station. The outputs of the spatial demultiplexers 46 are spatially separated signals 50 for each subscriber station communicating with the base station. In an alternate embodiment, the demultiplexing and demodulation processing are performed together in a non-linear multidimensional signal processing unit. The demodulated received signals 54 are then available to the switching network 58 and the WAN 56. In one embodiment, the multi-channel receivers also receive timing signals from GPS (Global Positioning System) satellites or some other radio precision timing signal which is then provided to the SDMAP for precise timing that is synchronized across all base stations in the system.

In an FDMA system implementation, each multi-channel receiver and each multi-channel transmitter is capable of handling multiple frequency channels. In other embodiments, the multi-channel receivers 42 and multi-channel transmitters 70 may instead handle multiple time slots, as in a TDMA or TDD system, multiple codes, as in a CDMA system, or some combination of these well known multiple access techniques.

Figure 2:
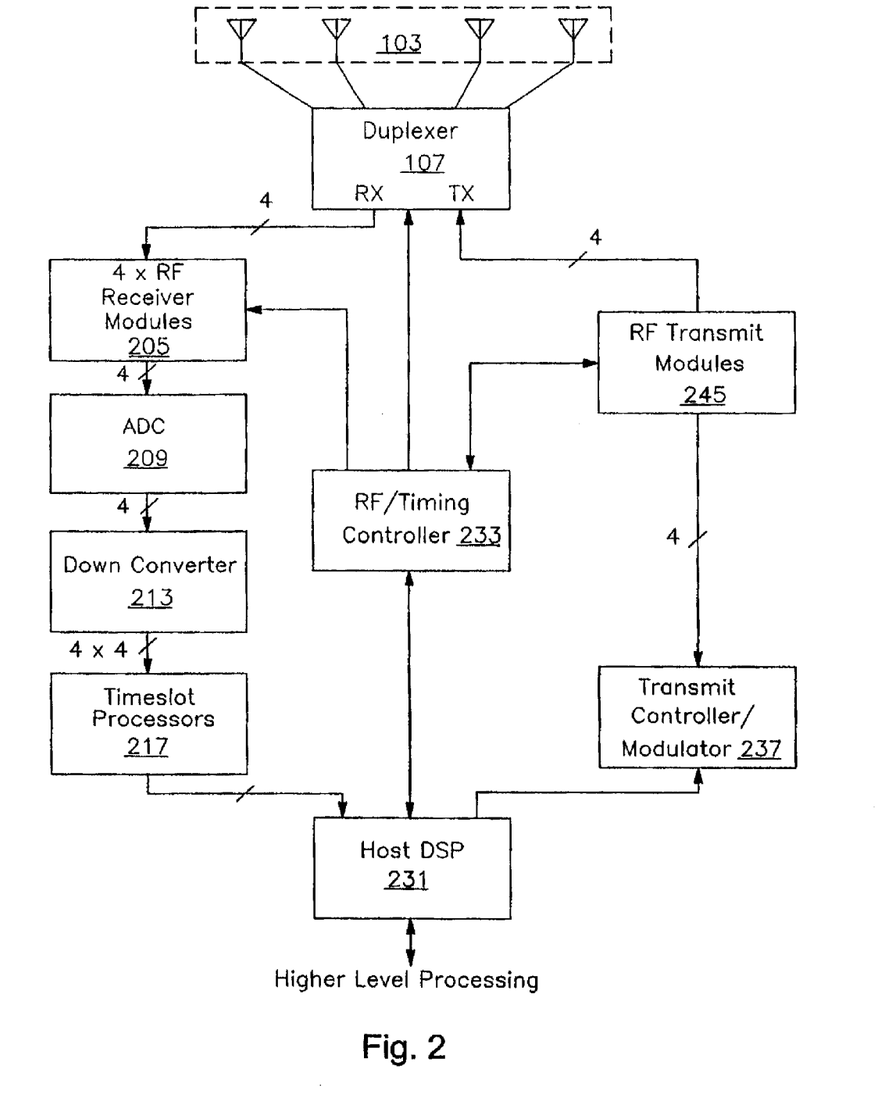
FIG. 2 is a simplified block diagram of a base station on which an embodiment of the invention can be implemented.
Figure 4:
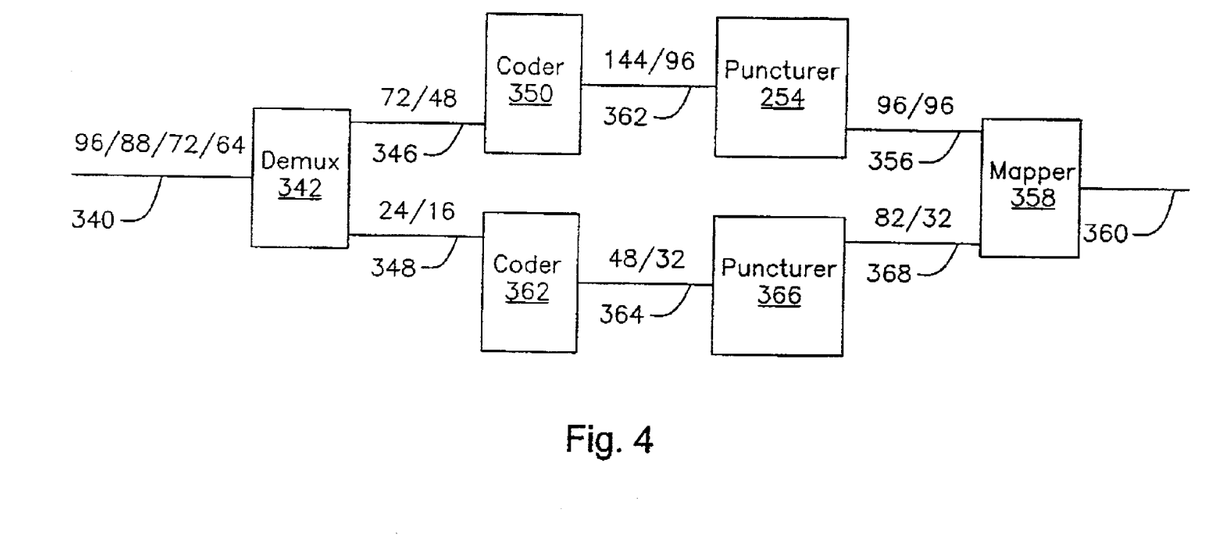
FIG. 4 is block diagram of a codec according to another embodiment of the present invention.

FIG. 2 shows an alternative embodiment of a wireless communications system suitable for implementing the present invention. This system is typically coupled to a switching network and WAN similarly to the system of FIG. 1 such as switching network 58 and WAN 56. In FIG. 4, a plurality of antennas 103 is used, for example four antennas, although other numbers of antennas may be selected. The outputs of the antennas are connected to a duplexer switch 107, which in this TDD system is a time switch. Two possible implementations of switch 107 are as a frequency duplexer in a frequency division duplex (FDD) system, and as a time switch in a time division duplex (TDD) system. When receiving, the antenna outputs are connected via switch 107 to a receiver 205, and are mixed down in analog by RF receiver ("RX") modules 205 from the carrier frequency (for example around 1.9 GHz) to an FM intermediate frequency ("IF") of, for example, 384 kHz. This signal then is digitized (sampled) by analog to digital converters ("ADCs") 209 at, for example, 1.536 MHz. Only the real part of the signal is sampled. Thus, in complex phasor notation, the digital signal can be visualized as containing the complex valued IF signal at 384 kHz together with an image at −384 kHz. Final down-converting to baseband is carried out digitally by multiplying the 1.536 megasamples per second real-only signal by a 384 kHz complex phasor. The result is a complex valued signal that contains the complex valued baseband signal plus an image at, for example, −2×384=−768 kHz. This unwanted negative frequency image is filtered digitally to produce the complex valued baseband signal sampled at 1.536 MHz. GrayChip Inc. GC2011 digital filters can be used to implement the down-converting and the digital filtering, the latter using finite impulse response (FIR) filtering techniques. This is shown as block 213. The particular frequencies suggested above are provided by way of example. The invention can be adapted to suit a wide variety of RF and IF carrier frequencies and bands.

There are, in the present example, four down-converted outputs from each antenna's GC2011 digital filter device 213, one per receive timeslot. The particular number of timeslots can be varied to suit network needs. While the present example uses four uplink and four downlink timeslots for each TDD frame, desirable results have also been achieved with three timeslots for the uplink and downlink in each frame. For each of the four receive timeslots, the four down-converted outputs from the four antennas are fed to a digital signal processor (DSP) device 217 (hereinafter "timeslot processor") for further processing, including calibration, according to one aspect of this invention. Four Motorola DSP56303 DSPs can be used as timeslot processors, one per receive timeslot.

The timeslot processors 217 perform several functions including the following: received signal power monitoring; frequency offset estimation and time alignment; smart antenna processing including determining weights for each antenna element to determine a signal from a particular remote user; and demodulation of the determined signal.

The output of the timeslot processor 217 is demodulated burst data for each of the four receive timeslots. This data is sent to a host DSP processor 231 whose main function is to control all elements of the system and interface with the higher level processing, which is the processing which deals with what signals are required for communications in all the different control and service communication channels defined in the system's communication protocol. The host DSP 231 can be a Motorola DSP56303. In addition, timeslot processors send the determined receive weights to the host DSP 231. The main functions of the host DSP 231 specifically include:

maintaining state and timing information;

receiving uplink burst data from the timeslot processors 217;

programming the timeslot processors 217;

processing the uplink signals, including de-encrypting, de-scrambling, error correcting code checking, and burst deconstruction of the uplink;

formatting the uplink signal to be sent for higher level processing in other parts of the base station;

formatting service data and traffic data for further higher processing in the base station;

receiving downlink messages and traffic data from the other parts of the base station;

processing of downlink bursts (burst construction, encoding, scrambling and encryption);

formatting and sending downlink bursts to a transmit controller/modulator, shown as 237;

programming the transmit controller/modulator 237, including determining and sending transmit weight vectors to the transmit controller/modulator 237;

controlling the RF controller shown as 233; and maintaining and reporting modem status information, and controlling synchronization.

The RF controller 233 interfaces with the RF system, shown as block 245 and also produces a number of timing signals that are used by both the RF system and the modem. The specific tasks performed by the RF controller 233 include:

producing timing signals for the RF system (RX and TX) and other parts of the modem;

reading transmit power monitoring values;

writing transmit power control values;

producing the duplexer 107 switch box control signal; and reading automatic gain control (AGC) values.

the RF controller 233 receives timing parameters and other settings for each burst from the host DSP 231.

The transmit controller/modulator 237, receives transmit data from the host DSP 231, four symbols at a time. The transmit controller uses this data to produce analog IF outputs which are sent to the RF transmitter (TX) modules 245. The specific operations transmit controller/modulator 237 performs are:

converting data bits into a complex modulated signal;

up-converting to an IF frequency using, for example, a GrayChip 2011;

4-times over-sampling the IF signal;

multiplying this 4-times over-sampled complex signal by transmit weights obtained from host DSP 231; and converting the real part of the resulting complex valued waveforms via digital to analog converters ("DACs") which are part of transmit controller/modulator 237 to analog transmit waveforms which are sent to the transmit modules 245.

The transmit modules 245 up-convert the signals to the transmission frequency and amplify the signals. The amplified transmission signal outputs are sent to antennas 103 via the duplexer/time switch 107.

Figure 3:
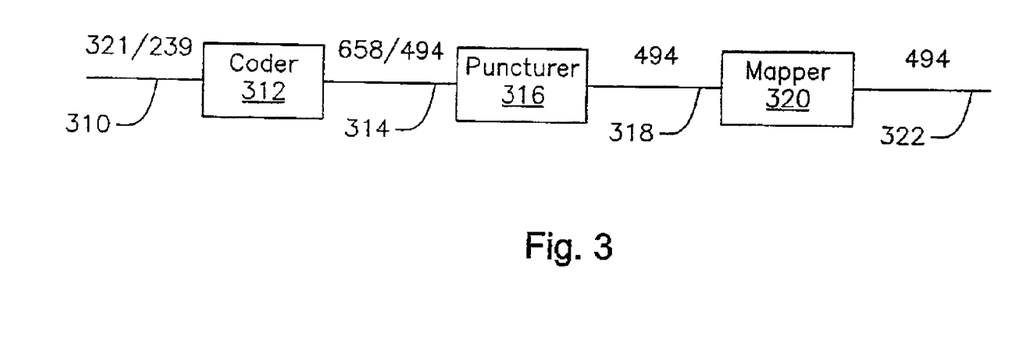
FIG. 3 is block diagram of a codec according to one embodiment of the present invention.

FIG. 3 shows a block diagram of a signal modulator, corresponding to block 62 of FIG. 1, according to one embodiment of the present invention. While only the portion related to encoding is shown, the invention is equally applicable to decoding with appropriate reversal of the described steps as is implemented in the signal demodulator 52 of FIG. 1 and as well-known in the art. In one embodiment, the blocks shown in FIG. 2 are implemented in a general purpose DSP (digital signal processor) such as a Motorola 56300 series DSP.

In one embodiment, the incoming bit stream 310 is processed in either 321 or 239 bit blocks, depending on whether puncturing has been enabled or not, although the precise number of bits may be varied here as well as throughout the present description to better suit particular applications. In the present invention 321 and 239 have been chosen because the number of symbols selected for transmission in each downlink time slot of each time division duplex frame has been selected as 494. As discussed below, applying the methods of the present invention maps the 321 or 239 bits into 494 symbols. For the uplink slot 182 symbols has been selected for each slot, accordingly the input block has either 113 or 83 bits. The particular selections of symbol rates and input block sizes can be selected to suit the particular application as appropriate. The input block is encrypted and contains some error detecting coding such as a 16-bit cyclic redundancy code in the last 16 bit positions. This encryption and coding is typically performed at earlier stages of physical layer processing by the same general purpose DSP.

The input blocks arrive at an input line 310 to a coder 312. In one embodiment, this convolutional coder has 256 states and is of constraint length 9 with 1 message bit per 2 coded bits. The coder is defined by the two generator sequences 561 and 753 (octal) or equivalently 101110001 and 111101011 (binary). The first and second generator sequences define the shift register taps for the first and second encoder output bits, respectively. The coder is initialized to the zero state before each input block and eight tail bits of value zero are added to the end of each input block. The outputs of the encoder are concatenated serially, alternating between the two shift register taps of the generator sequences to form a coded output bit stream of either 658 or 494 bits, depending on the size of the input block. Many other convolutional codes may be used with the present invention to suit particular applications as is well-known in the art.

The output is then provided to a puncturer 316 which can be enabled or disabled. In one embodiment, the puncturer punctures the coded output bit stream to delete the third bit from every block of four bits. Accordingly, the output encoded bit stream 318 of the convolutional coder is reduced to 494 bits for the 658 bit block and unaffected for the 494 bit block. The structure, after puncturing, is $c_1c_2c_4$, $c_5c_6c_8$, $c_9c_{10}c_{12}$, . . . , where c represents a convolutionally coded bit.

The alternately punctured or not punctured 494-bit block is provided to a mapper 320 which maps the data to a modulation scheme. The data is mapped to a phase shift keyed (PSK) constellation such as a binary PSK, Quadrature PSK or 8PSK constellation. The mapped symbols are then passed to the multiplexers 66 and transmitters 70 in the case of transmission from the base station 100. As shown in FIG. 3, if the bits are mapped to BPSK symbols, then the number of symbols will be the same as the number of bits, 494. However the input data blocks are increased by a third due to the application of puncturing.

As mentioned above, the size of the blocks input to the system can be varied in order to accommodate different system requirements. In the example above, a 321 or 239-bit block was selected for a downlink slot of 494 symbols. However, other size blocks can be used. In another example, mentioned above, 182 symbols is selected for an uplink slot. To accommodate this smaller set of symbols, the input block on line 310 is either 113 or 83 bits. The convolutional coder generates either a 242 or 182-bit block that is fed to the puncturer 316 on line 314. The resulting 182-bit blocks are then mapped into symbols as discussed above. While two examples have been set forth herein, many more possibilities can be developed as is well-known in the art.

FIG. 4 shows an alternative structure for the modulator 62. In FIG. 4, for simplicity, smaller block sizes will be used and it will be assumed that the coders 350, 362 simply double the size of the respective block. In addition, a much smaller number of symbols will be assumed. The desired input to the mapper 358 will be 128 bits in every case. The mapper can map this into varying numbers of symbols depending upon the modulation scheme that is employed. The input block on line 340 can be 96, 88, 72, or 64 bits depending upon the puncturing rate desired. These are divided roughly in half or in quarters in a demultiplexer 342 so that one portion goes to an e.g. 72 or 48-bit stream upper path 346 and the other portion to an e.g. 24 or 16-bit stream lower path 348. The division is done by assigning the first 72 or 48 bits to the upper path and the following 24 or 16 bits to the lower path. Alternatively, the initial bit can be assigned to the upper path 314 and every fourth bit thereafter can be assigned to the lower path 316. The bits can be divided in any other convenient fashion that is reversible in a receive channel.

The upper path is provided to the upper coder 350. In one embodiment, this is a convolutional coder such as the convolutional coder of FIG. 2. In alternate embodiments, any other type of coder may be used. The output 352 of this coder doubles the input to produce either a 144 or 96-bit block. This is provided to a puncturer 354. The 144 bit-block is punctured. The 96-bit block is not. The puncturer punctures the coded output bit stream to delete the fourth and sixth bit from every block of six bits. Accordingly, the output encoded bit stream 318 of the convolutional coder is formed into 96-bit blocks, each having 24 4-bit sub blocks. The structure, after puncturing, is $c_1c_2c_3c_5$, $c_7c_8c_9c_{11}$, $c_{13}c_{14}c_{15}c_{17}$, . . . , where c represents a convolutionally coded bit. Alternatively a ¾ puncturer such as the puncturer described above with respect to FIG. 3 can be used. The puncturer output 356 is sent as e.g. 96-bit convolutionally coded blocks to a mapper 358 which provides output lines 360, such as I and Q signal lines mapped into a PSK constellation.

The lower 24 or 16-bit output 348 of the demultiplexer 342 is applied to a block coder such as a Hamming code encoder 362. While in the described embodiment, a convolutional coder and a block coder are used for the two paths as described above, both coders can be block coders of any particular kind or both coders can be convolutional coders of any particular kind. The specific choice depends upon the particular circumstances and the application. Alternatively, coding can be eliminated completely from one or both of the paths. The Hamming coder calculates and appends an error correcting code that doubles the size of the input to form a 48 or 32-bit output 364. The 48 or 32-bit coded blocks are passed next to a puncturer 366 which operates similarly to the upper puncturer 354. As in the upper path only the larger blocks are punctured so that the result is a 32-bit block. The punctured output 368 goes to the mapper 358 as blocks of 32 bits.

The mapper 358 takes the inputs 356, 368 from the upper and lower paths and builds symbols of one to eight bits each depending on the modulation desired. The symbols are mapped into the I and Q coordinates for the chosen, PSK constellation for transmission over the channel as is well known in the art.

As discussed above, the puncturers 316, 354, 366 can alternately be enabled and disabled thus changing the bit rate of the encoder in terms of bits received on the input line 310, 340 per symbol produced on the output line 322, 360. The puncturers are used to increase the number of bits that are provided to the demultiplexer. Accordingly, the modulation scheme is maintained, while the rate of the bits provided in the input line is changed. Alternatively, this reduction can be used with a constant size input stream so that the number of symbols can be reduced or the bit size of the symbols can be reduced, for example, from three bits to two bits.

So, in the example illustrated in FIG. 3, the incoming bit stream is in 321-bit blocks for the punctured set or 239-bit blocks for the unpunctured set. The block size is increased to 658 and 494 in the coder. The puncturer will alternately delete one quarter of the bits or do nothing so the output on line 318 into the mapper will be 494 bits. If the mapper maps the bits into a QPSK symbol set of two bits each, the result is 247 symbols. This provides alternately a 1.3 or 1.0 bit-per-symbol encoding. With BPSK, the bit-per-symbol rates would be roughly 0.67 and 0.5. As is well-known in the art, the punctured bits must be recovered in the receiver using the codes that are transmitted with the data. Accordingly, puncturing is only enabled when the channel is adequate to allow the transmitted symbols to be received well enough for accurate depuncturing. The numbers provided above for the rate 1.3 and 1.0 encoders are provided as examples only. The coding rate, the puncturing rate, as well as the particular block sizes may be varied as necessary under the circumstances.

The example illustrated in FIG. 4 provides greater rate flexibility than the example illustrated in FIG. 3 just discussed above. The input block size on line 340 can be 96, 88, 72 or 64 bits and it is divided so that three-fourths (72 or 48 bits) goes to the upper path 346 and one-fourth (48 or 32 bits) to the lower path 348. The coders will then each double the block size for encoded blocks, for the respective puncturers 354, 366. Either of the puncturers may be enabled or disabled, so that the top puncturer will produce a 96 bit output 356 to the mapper and the lower puncturer will produce a 32-bit output 368 to the mapper. Accordingly, the mapper may receive the data in blocks of 128 bits. The bits are then mapped into symbols at a rate that is determined by the type of modulation desired. Table 1 below shows the number of symbols generated for each of several different modulation schemes. The bit-per-symbol is shown in each column for the different input block sizes. As is well understood by those skilled in the art, the particular number selected for purposes of the example illustrated in FIG. 4 can be modified to suit different applications.

TABLE 1

| Modulation | 96 bits | 88 bits | 72 bits | 64 bits |
| --- | --- | --- | --- | --- |
| BPSK 128 | 0.75 | 0.7 | 0.56 | 0.5 |
| QPSK 64 | 1.5 | 1.4 | 1.1 | 1.0 |
| 8PSK 32 | 3.0 | 2.75 | 2.25 | 2.0 |
| 16QAM 16 | 6.0 | 5.5 | 4.5 | 4.0 |
| 32QAM 8 | 12.0 | 11.0 | 9 | 8.0 |

In order for the received signal to be properly demodulated in demodulator 52, the amount of puncturing must be known. In certain applications, it may be possible for the demodulator to determine the puncture rate by analyzing the received signal. In another embodiment, the puncture rate is communicated directly to the receiver.

In the exemplary wireless communication system described with respect to FIG. 1, the remote terminals establish data communication channels with the base station 100. After this is done, the remote terminal and the base station exchange data packets in the form of modulated symbols created as discussed above with respect to FIGS. 3 and 4. The packets are transmitted in groups as bursts on respective uplink and downlink TDMA channels that hop frequencies according to a determined sequence. Accordingly, each burst is followed by a guard time to reduce the likelihood of interfering with the subsequent burst for a different remote terminal sharing the TDMA link channel. The uplink and downlink bursts have a structure as shown in Table 2, below. Each burst has a duration on the order of a millisecond.

TABLE 2

| Ramp-Up | Training Sequence | Transmitted Data Packets | Ramp-Down | Guard |
| --- | --- | --- | --- | --- |

The ramp-up and ramp-down times are determined by the requirements of the transmitter and receiver. The training sequence will depend also on the transmitter and receiver as well as the quality of the channels. The transmitted data packets include various identification and channel description headers as are well-known in the art, such as the transmitter's ID. No., frame and slot Nos., encryption data and acknowledgments of any requests outstanding from the receiver. The particular number and nature of these kinds of headers and signals will depend on the network. There may also be headers to identify the data that follows the general overhead. The headers include, within the transmitted data packets, a code that states whether puncturing has been applied to the subsequent data or not. For the example illustrated in FIG. 3, this code could be as little as a single bit in the designated location in the sequence. However, because of the importance of the information, an entire symbol can be used and be repeated in two different locations in the sequence. For the example illustrated in FIG. 4, at least two bits are required to represent the four different puncturing possibilities. In one embodiment, an entire symbol is used and it is repeated in the data package.

Alternatively, puncturing can be controlled by the receiver. Only the receiver knows how well the symbols are received and puncturing must be traded against accurate reception. Therefore, the use of puncturing can be increased if the receiver controls whether the packets that it receives are punctured. Puncturing can be enabled when a session is established or it can be negotiated during a session. In one embodiment, each received burst from the base station or remote terminal respectively, is followed by a transmitted burst from the same base station or remote terminal. As a result, each terminal can alter the puncturing state immediately after a burst has been received before the next one is received. This allows the use of puncturing to be consistently optimized for a changing channel. In order to optimize puncturing, an exchange of messages is communicated between the two terminals. Each terminal sends a request for puncturing to be enabled or disabled and each terminal states whether the transmitted packet is punctured or not. An example communication sequence is set forth in Table 3 below.

TABLE 3

| Base Station | Remote Terminal |
| --- | --- |
| Packet punctured, Enable puncturing | |
| | Packet punctured, Disable Puncturing |
| Packet not punctured, Enable puncturing | |
| | Packet punctured, Enable Puncturing |
| Packet punctured, Enable puncturing | |

Note that in the message sequence above, the remote terminal has controlled whether the packets that it receives are punctured or not. This decision is made by the remote terminal based on the error rate of the last received packet from the base station. In order to save on processing resources required in the remote terminal, the system could be configured so that only the base station controls puncturing for both transmitters. The processing that determines error rates and controls puncturing accordingly is performed in processing resources that are available to the remote terminal or base station and coupled to the decoders such as the SDMAP 48 shown in FIG. 1. This processing can be better understood by referring to FIG. 5.

Figure 5:
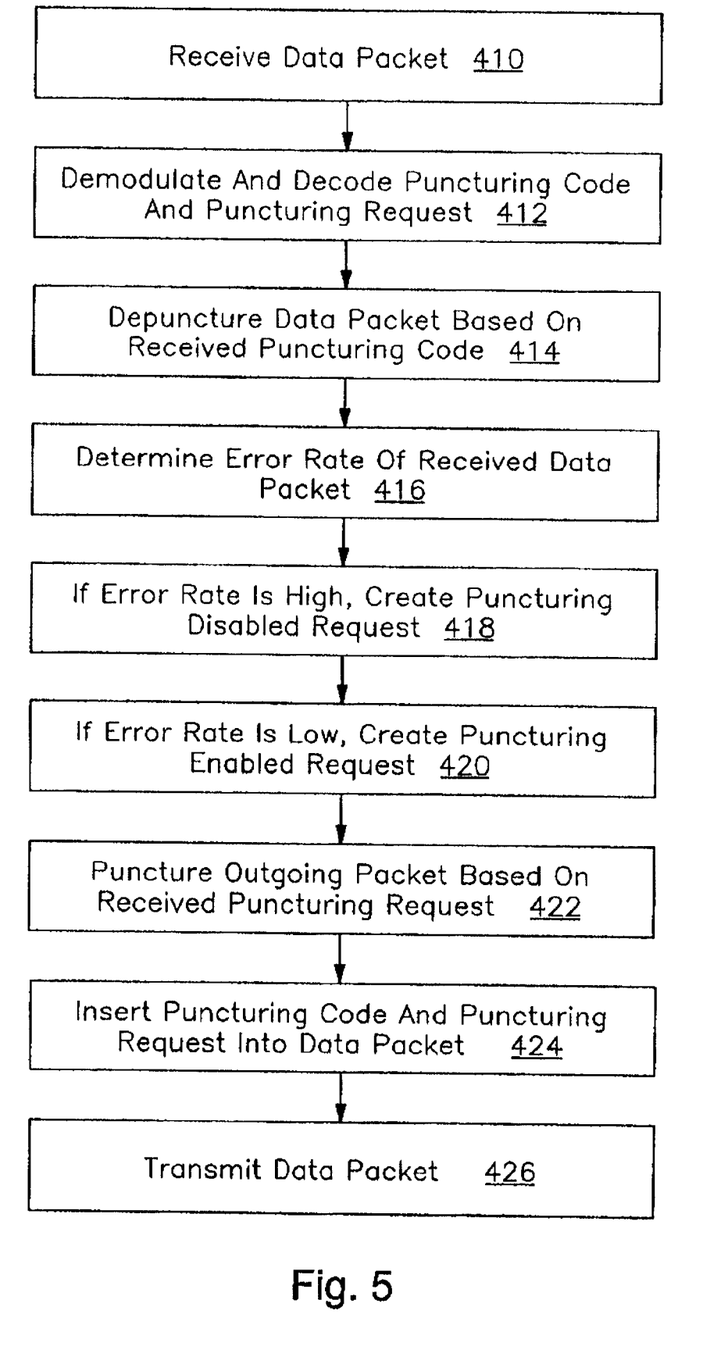
FIG. 5 is a flow diagram of a process for implementing an embodiment of the present invention.

FIG. 5 shows the process that is performed by either a base station or a remote terminal in the wireless system of FIG. 1. The process may be performed by any terminal of any system that is implementing the present invention. The process begins when the terminal receives a data packet, typically within a burst, from the transmitting terminal 410. In one embodiment, the processing is performed every time that a burst is received, however, it can be performed upon session initiation, after a certain number of bursts have been transmitted or at other times depending upon the design of the network. The receiving terminal demodulates and decodes at least the portion of the received data packets that contains the puncturing code and the puncturing request 412. The puncturing code indicates whether the received packet is punctured or not while the puncturing request indicates whether the transmitting terminal requests that the next packet that it receives be punctured. The form of the puncturing code and the puncturing request are described above and can be a yes/no or on/off indication as for the example illustrated in FIG. 3 or it can be as described above with respect to FIG. 4. After the puncturing code has been decoded, the receiving terminal depunctures the received data, if appropriate, as instructed by the puncturing code 414. At this point, it is possible for the receiving terminal, using the error detecting or error correcting codes of the data packet to determine the error rate of the received data packet 416. If no error detecting or correcting codes are used, it is still possible to determine an error rate using other signal analysis techniques as is well-known in the art.

If the error rate of the received data packet is high, then the receiver creates a puncturing disabled request 418. Alternatively, if the error rate is low, a puncturing enabled request is created 420. Error rates are typically characterized simply as bit error rates that indicate the number of bits that are received in error in a particular packet. The choice of what constitutes a high or low error rate will depend, in part, on the importance of accurate determination of the transmitted signal and, in part, on the amount of error correcting coding that is transmitted with the data packet. For a voice telephony system higher error rates can be tolerated than for a packet data communications system. The receiving terminal subsequently, or at the same time, prepares its outgoing packet for transmission. Puncturing is applied or not depending on the received puncture request 422 and a puncturing code is generated to indicate whether puncturing has been applied. The puncturing code and the puncturing request determined in steps 418 and 420 are accordingly inserted into the data packet 424 and the data packet is transmitted 426. The same process is then repeated at the receiving terminal. Note that in one embodiment, there is no separate process to acknowledge a puncturing request. Instead of an acknowledgement, the transmitting terminal states whether it has applied puncturing. Normally, the transmitting terminal will comply with the request that it receives, so that the puncturing code serves as an acknowledgment of the prior request. If, however, the puncturing request is misunderstood, the receiving terminal will know because the received puncturing code will be inconsistent with the puncturing request. If the channel has not changed, the receiving terminal can then resend the earlier request. The puncture code accordingly, renders any acknowledgement unnecessary. However, with other system designs, the puncture request can be acknowledged before the data packet is sent.

In the description above, for the purposes of explanation, numerous specific details are set forth in order to provide a thorough understanding of the present invention. It will be apparent, however, to one skilled in the art that the present invention may be practiced without some of these specific details. In other instances, well-known structures and devices are shown in block diagram form.

The present invention includes various steps. The steps of the present invention may be performed by hardware components, such as those shown in FIG. 1, or may be embodied in machine-executable instructions, which may be used to cause a general-purpose or special-purpose processor or logic circuits programmed with the instructions to perform the steps. Alternatively, the steps may be performed by a combination of hardware and software.

The present invention may be provided as a computer program product which may include a machine-readable medium having stored thereon instructions which may be used to program a computer (or other electronic devices) to perform a process according to the present invention. The machine-readable medium may include, but is not limited to, floppy diskettes, optical disks, CD-ROMs, and magneto-optical disks, ROMs, RAMs, EPROMs, EEPROMs, magnet or optical cards, flash memory, or other type of media or machine-readable medium suitable for storing electronic instructions. Moreover, the present invention may also be downloaded as a computer program product, wherein the program may be transferred from a remote computer to a requesting computer by way of data signals embodied in a carrier wave or other propagation medium via a communication link (e.g., a modem or network connection).

Importantly, while the present invention has been described in the context of a wireless internet data system for portable handsets, it can be applied to a wide variety of different wireless systems in which data is exchanged. Such systems include voice, video, music, broadcast and other types of data systems without external connections. The present invention can be applied to fixed remote terminals as well as to low and high mobility terminals. Many of the methods are described herein in a basic form but steps can be added to or deleted from any of the methods and information can be added or subtracted from any of the described messages without departing from the basic scope of the present invention. It will be apparent to those skilled in the art that many further modifications and adaptations can be made. The particular embodiments are not provided to limit the invention but to illustrate it. The scope of the present invention is not to be determined by the specific examples provided above but only by the claims below.

What is claimed is:

1. A method comprising:
   receiving a puncturing code from a radio terminal through a channel;
   receiving a first data packet from the radio terminal through the channel;
   depuncturing the data packet in accordance with the received puncturing code receiving a puncturing request from the radio terminal through the channel;
   puncturing a second data packet in accordance with the puncturing request;
   creating a puncturing code indicating the puncturing that has been applied to the second data packet; and
   transmitting the punctured second data packet with the puncturing code to the radio terminal.

2. The method of claim 1, wherein the puncturing code is received with the data packet.

3. The method of claim 1, wherein depuncturing the data packet includes alternately depuncturing or not depuncturing in accordance with the puncturing code.

4. The method of claim 1, wherein depuncturing the data packet includes depuncturing according to one of a plurality of different depuncturing schemes in accordance with the puncturing code.

5. The method of claim 1, further comprising determining an error rate for the received data packet and transmitting a puncture request to the remote terminal based on the determined error rate.

6. The method of claim 1, wherein transmitting a puncture request includes transmitting a request that data packets be punctured if the determined error rate is low and transmitting a request that data packets not be punctured if the determined error rate is high.

7. The method of claim 1, further comprising decoding the received data packet.

8. The method of claim 1, wherein the channel comprises a frequency bopping time division duplex radio channel.

9. The method of claim 1, wherein the puncturing request is received with the first data packet.

10. The method of claim 1, wherein transmitting the punctured second data packet and the puncturing code comprises transmitting through the channel.

11. A method comprising:
    receiving a puncturing request;
    puncturing a data packet in accordance with the puncturing request;
    creating a puncturing code indicating the puncturing that has been applied to the data packet; and
    transmitting the punctured data packet and the puncturing code.

12. The method of claim 11, wherein the puncturing request is received with the data packet.

13. The method of claim 11, wherein the puncturing request is received through a channel and wherein transmitting the punctured data packet and the puncturing code comprises transmitting through the channel.

14. The method of claim 11, further comprising:
    receiving the transmitted data packet;
    determining an error rate for the received data packet; and
    transmitting a puncture request based on the determined error rate.

15. The method of claim 14, wherein transmitting a puncture request includes transmitting a request that data packets be punctured if the determined error rate is low and transmitting a request that data packets not be punctured if the determined error rate is high.

16. The method of claim 14, further comprising transmitting a data packet to the transmitting station and wherein transmitting a puncture request includes transmitting the request with the transmitted data packet.

17. The method of claim 14, further comprising receiving a puncturing code and depuncturing the received data packet in accordance with the received puncture code.

18. A machine-readable medium having stored thereon data representing sequences of instructions which, when executed by a machine, cause the machine to perform operations comprising:
    receiving a puncturing code from a radio terminal through a channel;
    receiving a first data packet from the radio terminal through the channel;
    depuncturing the data packet in accordance with the received puncturing code;
    receiving a puncturing request from the radio terminal through the channel;
    puncturing a second data packet in accordance with the puncturing request;
    creating a puncturing code indicating the puncturing that has been applied to the second data packet; and
    transmitting the punctured second data packet with the puncturing code to the radio terminal.

19. The medium of claim 18, wherein the puncturing code is received with the data packet.

20. The medium of claim 18, wherein the instructions for depuncturing the data packet include instructions causing the machine to perform operations comprising alternately depuncturing or not depuncturing in accordance with the puncturing code.

21. The medium of claim 18, wherein the instruction for depuncturing the data packet include instructions causing the machine to perform operations comprising depuncturing according to one of a plurality of different depuncturing schemes in accordance with the puncturing code.

22. The medium of claim 18, further comprising instructions causing the machine to perform operations comprising determining an error rate for the received data packet and transmitting a puncture request based on the determined error rate.

23. An apparatus comprising:
    a receiver of a wireless communications system to receive a puncturing code through a channel, a puncturing request and a first data packet through the channel;
    a demodulator coupled to the receiver to depuncture the first data packet in accordance with the received puncturing code;
    a modulator to puncture a second data packet in accordance with the puncturing request;
    a signal processor to create a puncturing code indicating the puncturing that has been applied to the second data packet; and
    a transmitter to transmit the punctured second data packet and the puncturing code.

24. The apparatus of claim 23, wherein the puncturing code is received with the data packet.

25. The apparatus of claim 23, wherein the demodulator is operable to alternately depuncture or not depuncture in accordance with the puncturing code.

26. The apparatus of claim 23, further comprising a signal processor to determine an error rate for the received data packet and a transmitter to transmit a puncture request through the channel based on the determined error rate.

* * * * *